United States Patent Office 3,551,956
Patented Jan. 5, 1971

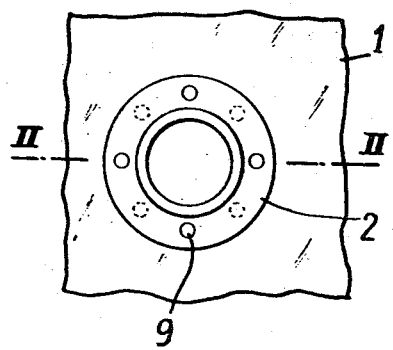
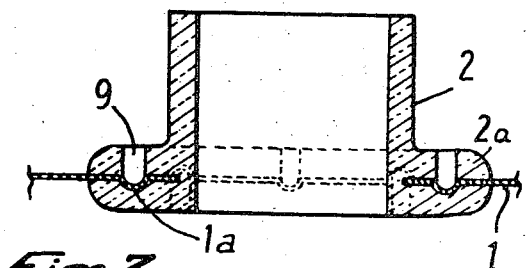
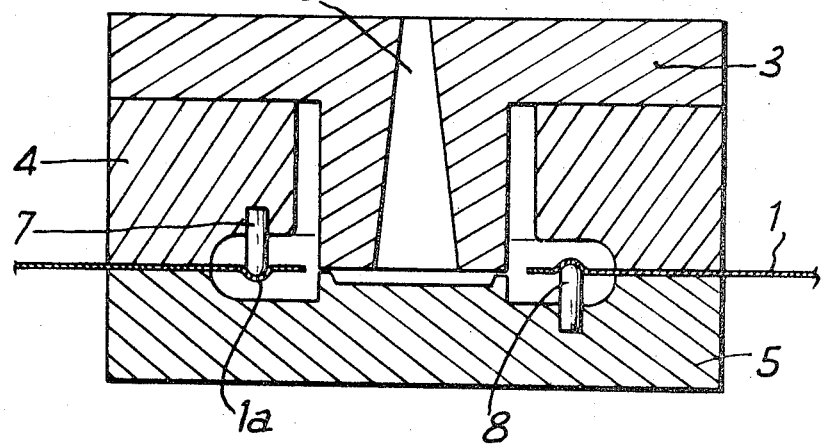
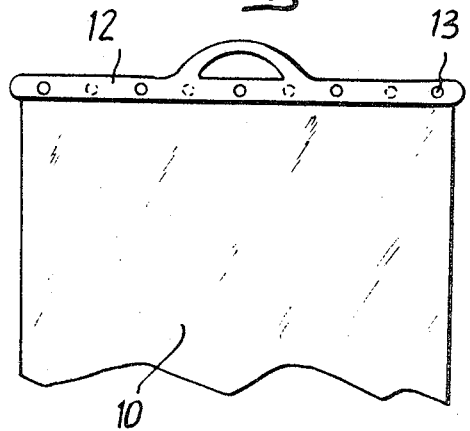
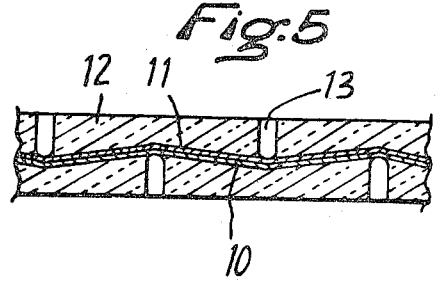

3,551,956
INJECTION MOLD HAVING PREFORM
SECURING MEANS
Jean-Jacques Rosier, 19 Route de la Celle St. Cloud,
Bougival, Yvelines, France
Filed Apr. 10, 1968, Ser. No. 720,143
Claims priority, application France, Apr. 10, 1967,
102,042; Jan. 15, 1968, 135,930
Int. Cl. B29d 3/00
U.S. Cl. 18—36    4 Claims

ABSTRACT OF THE DISCLOSURE

A mould is provided for casting an element onto a sheet and the mould has two elements joined along a joint plane and defining a mould cavity. A sheet is clamped between the mould elements and is positioned in the mould cavity along the joint plane. A plastic material is injected through an inlet orifice and is joined with the sheet. The mould elements are provided with respective projections extending into the mould cavity in opposite directions beyond the joint plane to contact the sheet and produce undulations therein in order to tension the sheet during the moulding process. The projections are arranged in alternating relation either in linear or annular array.

In order to form a nozzle or a sleeve in an aperture in sheet material, it is known to inject a plastic material, about the rim of the aperture, the sheet being disposed between two elements of a mould.

However, it is currently extremely difficult, during this operation, to achieve a uniform distribution of the injected plastic material on either side of the sheet. It sometimes even occurs that the plastic material pushes the sheet away and is built up substantially on only one side thereof. The nozzle or tube produced, instead only of being integral with the sheet, merely adheres thereto. Fluid-tightness is not reliably achieved and it may even occur that the nozzle or sleeve is locally separated from the sheet, with the result that leakage takes place.

The present invention relates to a process for the manufacture of a fitted element, in particular a nozzle (or tube) or sleeve, on sheet material, by the injection of plastic material, by means of which process the disadvantages discussed hereinabove are avoided.

The process according to the invention is characterized in that, during moulding, the edge of the sheet is tensioned, while an undulating shape is imparted to it.

The invention also relates to a mould for effecting the process.

The mould is characterized in that the mould elements thereof comprise studs projecting externally relatively to the joint plane and alternatingly arranged, some studs being fast with one of the mould elements whereas the others are fast with the opposite mould element.

Finally, the invention relates to sheets comprising a fitted-on element, for example a nozzle or sleeve, produced by the process and with the aid of the mould described hereinabove, and also to containers produced with the aid of a sheet of this kind.

In the following text, a description will be given, purely by way of non-limitative example, of two modes of embodiment of the invention, with reference to the accompanying drawings, wherein:

FIG. 1 is an elevational view of a wall having an outlet nozzle thereon produced in accordance with the invention, FIG. 2 is a cross-section taken along line II—II in FIG. 1, FIG. 3 is a cross-sectional view of the mould used for forming the nozzle shown in FIG. 1, the section plane of the right-hand half being at 45° relative to the section plane of the left-hand half, FIG. 4 is an elevational view of a case having two walls which are joined by a closure strip, and FIG. 5 is a cross-sectional view of part of the case of FIG. 4.

Referring to FIG. 1, reference numeral 1 designates a sheet formed with an aperture the rim of which comprises an outlet nozzle 2 obtained by injection moulding and having an outer collar 2a. The sheet 1 may be made for example of plastic material such as polyethylene, from kraft paper or from a composite material consisting of paper and plastic; in the latter case, it is advantageous that one of the outer layers of the composite material be made from the same material as the nozzle 2.

In order to form the nozzle, a mould is used which, in the embodiment shown in FIG. 3, comprises three elements 3, 4 and 5, the joint plane being determined by the elements 4 and 5. The element 3 is formed with an injection orifice 6.

Each of the elements 4 and 5 comprises fingers or studs 7 and 8 which project beyond the joint plane. The said studs in alternating arrangement, projecting beyond the between two studs 8 and, in an analogous manner, a stud 8 is disposed between two studs 7. In the example illustrated, each of the elements comprises four studs but this number could, of course, be different.

When the sheet 1 is interposed between the two mould elements, the studs undulate the edge 1a of the aperture in the sheet 1 and consequently tension the said edge. When the plastic material is then injected through the orifice 6, the edge 1a is firmly maintained within the collar 2a of the nozzle formed, substantially in the median plane of the collar. The connection between the nozzle and the sheet is perfectly fluid-tight, despite the presence of the apertures 9 formed in the nozzle.

It will be possible to proceed in the same manner in order to form a strip joining two sheets, for example the two walls of a case, in order to close the said case, and reinforcing this joint.

Thus, FIGS. 4 and 5 show, for example, at 10 and 11, the two walls of a case which have been joined one upon the other by a closure strip 12 produced by injection moulding. The mould elements for the strip 12 comprise studs in alternating arrangement, projecting beyond the joint plane; the studs tensioned the edges of the walls 10 and 11 and at 13 may be seen the apertures which they have left in the strip.

It is self-evident that the invention is not to be considered as limited to the modes of embodiment described and illustrated but, on the contrary, covers all variants.

What is claimed is:

1. A mould for casting an element onto a sheet, said mould comprising first and second mould elements joined along a joint plane and defining a mould cavity, said mould elements having facing surfaces for clamping a sheet and positioning same in the mould cavity along said joint plane, said mould having an inlet orifice for material to be joined with the sheet, said mould elements including respective projections secured thereto and extending into said mould cavity in opposite directions beyond the joint plane to contact the sheet and produce undulation therein whereby the sheet is tensioned.

2. A mould as claimed in claim 1 wherein said projections are arranged in alternating relation.

3. A mould as claimed in claim 2 wherein said projections are in linear array.

4. A mould as claimed in claim 2 wherein said sheet has an opening and said projections are in annular array surrounding said opening in the sheet.

References Cited

UNITED STATES PATENTS

| 3,135,020 | 6/1964 | Holl et al. | 18—30(UM) |
| 3,330,004 | 7/1967 | Cloyd et al. | 264—275X |
| 3,362,302 | 1/1968 | Friedman | 18—36X |

J. SPENCER OVERHOLSER, Primary Examiner

M. O. SUTTON, Assistant Examiner

U.S. Cl. X.R.

18—30; 249—95; 264—275